US012384398B2

(12) United States Patent
Salter et al.

(10) Patent No.: US 12,384,398 B2
(45) Date of Patent: Aug. 12, 2025

(54) CONTROL AND MANAGEMENT OF UPFITTER AND VEHICLE LOADS (71) Applicant: FORD GLOBAL TECHNOLOGIES, LLC, Dearborn, MI (US)

(72) Inventors: Stuart C. Salter, White Lake, MI (US); David Celinske, Wolverine Lake, MI (US); Peter Attila Farkas, Ottawa (CA); Solomon Lin, Fort Wayne, IN (US); Sheran Anthony Alles, Livonia, MI (US); Peter Phung, Windsor (CA)

(73) Assignee: FORD GLOBAL TECHNOLOGIES. LLC, Dearborn, MI (US)

( * ) Notice: Subject to any disclaimer, the term of this patent is extended or adjusted under 35 U.S.C. 154(b) by 206 days.

(21) Appl. No.: 18/190,399

(22) Filed: Mar. 27, 2023

(65) Prior Publication Data
US 2024/0326850 A1   Oct. 3, 2024

(51) Int. Cl.
*B60W 50/14* (2020.01)
*B60L 58/15* (2019.01)
*B60W 30/188* (2012.01)
*B60W 50/00* (2006.01)

(52) U.S. Cl.
CPC ............ *B60W 50/14* (2013.01); *B60L 58/15* (2019.02); *B60W 30/1886* (2013.01); *B60L 2240/80* (2013.01); *B60L 2250/10* (2013.01); *B60L 2250/16* (2013.01); *B60W 2050/0083* (2013.01); *B60W 2050/143* (2013.01); *B60W 2050/146* (2013.01)

(58) Field of Classification Search
CPC ............ B60W 50/14; B60W 30/1886; B60W 2050/0083; B60W 2050/143; B60W 2050/146; B60L 58/15; B60L 2240/80; B60L 2250/10; B60L 2250/16; B60L 58/14; B60L 1/00–1/20
See application file for complete search history.

(56) References Cited

U.S. PATENT DOCUMENTS

| 8,103,414 | B2* | 1/2012 | Boss | B60W 10/06 701/124 |
| 9,959,687 | B2 | 5/2018 | Lindsay | |
| 2008/0249780 | A1* | 10/2008 | Nakashima | G10L 13/00 704/E15.001 |
| 2012/0248866 | A1* | 10/2012 | Takeuchi | B60L 1/02 307/9.1 |
| 2013/0249280 | A1* | 9/2013 | Goodermuth | B60L 1/00 307/9.1 |
| 2015/0373666 | A1* | 12/2015 | Malahy | H04W 68/00 455/414.1 |

(Continued)

FOREIGN PATENT DOCUMENTS

| AU | 2019232950 B2 | 10/2019 |
| CN | 109383415 B | 2/2019 |

(Continued)

*Primary Examiner* — Ryan W Sherwin
(74) *Attorney, Agent, or Firm* — Frank Lollo; Brooks Kushman P.C.

(57) ABSTRACT

A vehicle power system generates alerts prior to discontinuance of power to upfitter loads and vehicle loads according to a user defined priority sequence such that the alerts generated prior to discontinuance of power to the upfitter loads are different than the alerts generated prior to discontinuance of power to the vehicle loads.

17 Claims, 4 Drawing Sheets (56) References Cited

U.S. PATENT DOCUMENTS

| | | |
|---|---|---|
| 2017/0072850 A1 | 3/2017 | Curtis et al. |
| 2020/0198467 A1* | 6/2020 | Shaughnessy ........ B60P 1/6409 |
| 2021/0309110 A1* | 10/2021 | Wiegman ................ B60L 50/50 |
| 2021/0316617 A1* | 10/2021 | Pugh ....................... H02P 9/008 |
| 2022/0111716 A1* | 4/2022 | McKibben .............. B60L 50/62 |
| 2022/0242395 A1* | 8/2022 | Sawada ................. B60W 50/14 |

FOREIGN PATENT DOCUMENTS

| | | |
|---|---|---|
| CN | 105936275 B | 6/2020 |
| DE | 102021000243 A1 | 3/2021 |
| JP | 5837464 B2 | 12/2015 |

* cited by examiner

CONTROL AND MANAGEMENT OF UPFITTER AND VEHICLE LOADS

TECHNICAL FIELD

This disclosure relates to automotive power systems.

BACKGROUND

An automotive vehicle may include an energy storage device, such as a battery. This energy may be made available to electrical and electronic components of the vehicle and outside the vehicle. After-market snow plow equipment, for example, may be powered by energy from a battery. Such connections with the battery may be facilitated by a so-called upfitter module.

SUMMARY

A power system of a vehicle includes one or more controllers that receive input of a user defining a priority order that indicates a sequence in which supply of power to upfitter loads and vehicle loads will be discontinued responsive to a magnitude of current associated with power from the vehicle being supplied to the upfitter loads approaching a predefined threshold, and generates alerts prior to discontinuance of power to the upfitter loads and vehicle loads according to the sequence such that the alerts corresponding to discontinuance of power to the upfitter loads are different than the alerts corresponding to discontinuance of power to the vehicle loads.

A method includes, responsive to a magnitude of current associated with power from a vehicle being supplied to upfitter loads approaching a predefined threshold, discontinuing supply of power to the upfitter loads according to a user defined priority order such that the upfitter loads of lowest priority among the priority order are sequentially shed first to maintain the magnitude less than the predefined threshold, and generating an alert corresponding to the shed of each of the upfitter loads according to types defined by the user such that the alert corresponding to the shed of one of the upfitter loads is different than the alert corresponding to the shed of another one of the upfitter loads.

A vehicle has a power distribution center including an output, an upfitter module connected to the output, and one or more controllers. The one or more controllers, responsive to a magnitude of current associated with power from the vehicle supplied to upfitter loads, that are connected with the power distribution center via the upfitter module, exceeding a predefined threshold, preclude supply of the power to at least one of the upfitter loads for a predefined duration of time, and responsive to the magnitude exceeding the predefined threshold a predefined number of times, generate an alert recommending that at least one component be installed in the vehicle to increase the predefined threshold.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles typically include a power supply to facilitate functioning of various electrical and electronic components. Several power supply architectures are commonly used in automotive applications, including centralized, decentralized, and hybrid power supply architectures.

Centralized power supply architectures can include a single power supply unit that provides power to all electrical and electronic components in the vehicle. This architecture may be simple and easy to install. In some circumstances however, it may not be suitable for vehicles with high power requirements or those that have different voltage levels for different components.

Decentralized power supply architectures can include multiple power supply units located near the components they power. This architecture may be more flexible than centralized power supply architectures as it permits different voltage levels to be provided to different components. It can also be efficient by reducing the power loss that occurs when power is transmitted over relatively long distances. Decentralized power supply architectures, however, can be more complex with the potential increase in number of connections between power supply units and corresponding components.

Hybrid power supply architectures can be a combination of centralized and decentralized power supply architectures: A central power supply unit provides power to some electrical and electronic components, while other components are powered by decentralized power supply units. This architecture, in certain applications, may provide a balance between flexibility and efficiency.

The use of upfitter modules can affect the power supply systems of automotive vehicles. Upfitter modules, in some examples, are modular components that can be added to a vehicle to provide additional functionality, such as lighting, power distribution, or electrical power management. An upfitter module that provides lighting and power distribution, for example, can be installed in a vehicle, allowing it to be used as a work vehicle, such as a service truck or construction vehicle. Additionally, upfitter modules can be designed to meet specific requirements, such as providing power to a specific component or group of components.

Several factors can be considered when selecting an upfitter module, including the power requirements of the component or group of components that the upfitter module will power, the voltage level required, and the environmental conditions in which the upfitter module will be used.

Some upfitter modules may not support medium or high current applications, may not be expandable, may not provide feedback to the vehicle to manage effects of high current loads, and/or do not support added video cameras, etc.

Certain upfitter modules have taken the form of switches mounted in an over-head compartment and relays in an add-on engine compartment power distribution box. In some arrangements, wires are fed to the engine compartment power distribution box, but not connected to relays. Screens may be used to support touch drive of field effect transistors that control loads.

Here, architectures that provide upfitters opportunity to enable both low power and high power loads that are controlled by the vehicle with feedback are contemplated. In some examples, a base upfitter module is tied to the vehicle via Ethernet and acts as a gateway connecting down-stream expansion modules. A plurality of additional upfitter modules can be connected to the first. Each expansion module recognizes that it is either a master or not, and is daisy chained to a preceding module. This allows the number of modules to be expanded. Each of these modules may thus be plug-and-play, sending signals back to the controller reporting their capabilities. All expansion modules may receive their power from a 100 A output, 200 A output, or other rated output of a power distribution center for example. As current usage approaches (e.g., comes within 10% or 5% of) the limit, an operator is notified: The base module reports on loads to the controller.

This arrangement permits automatic load shedding of other vehicle loads and/or upfitter loads, and is programmable by a user, can run off power from an auxiliary charger trailer with a DC/DC converter, and allows key-off operation. Moreover, high current is tied with the batteries to keep transients off of the expansion module power and permits the batteries to act as transient suppression agents for the high current module.

Alerts (e.g., audio, visual, etc.) may be used to indicate that load shedding is expected (e.g., the power limit at which load shedding will occur is being approached) or is actually taking place. Such alerts may be calibrated based on background noise, distance to others, and/or location. Cameras, radar, and the like, for example, could be used to detect whether people are nearby, whether the vehicle is indoors or outdoors, etc. If the vehicle is indoors and people are nearby, audio alerts may be generated at lower volume to contribute less to ambient noise. Alerts may also be used to indicate the type of load shedding that is about to occur. Expected shedding of vehicle loads, for example, may be associated with different user defined sounds than expected shedding of upfitter loads. Graphic displays related to the same may also be different in similar fashion.

When current magnitude limits are exceeded, the system may generate notifications using sound exciters, window projectors, etc. It may further have the capability to count the number of occurrences that such limits were exceeded over the lifetime of corresponding field effect transistors, and project remaining life of the field effect transistors. Determination of excessive field effect transistor trips may be aggregated and averaged over some predefined period (e.g., eight hours). The amount of retries left may be limited, for example, to three retries with a minimum of a one minute cool down period per retry for each ignition cycle before permitting upfitter reactivation. In other arrangements, the amount of retries may depend on how the field effect transistor was tripped (considering for example time and overcurrent) using a look up table to determine severity and notifications to alert the user. If a field effect transistor is tripped on numerous occasions as a result of upfitter connection, the system may recommend a field effect transistor be installed in the system with higher threshold tolerance and available margin via a corresponding alert.

Prior to upfitter connection, a user may provide the vehicle the expected load profile to be incorporated into a corresponding configuration file. Use case details (e.g. identification data, expected duration, severity, resources needed, current consumption, etc.) may be incorporated into the configuration file which may be read as a look up table once the upfitter request is received. When communications are established with appropriate interfaces, the upfitter would be able to communicate intended needs based on "use case" systems. Alternatively, when communications have been established with the upfitter, the user may be able to enter/upload the expected load profile via touch screen with customized or pre-configured selections for review.

When a use case by the upfitter is sent, the system may make the determination if the request is valid or invalid based on available power supply capability. When the upfitter exceeds the allowable current draw threshold of the connected field effect transistor (e.g., 100 A or 200 A depending on the rating of the corresponding field effect transistor), the field effect transistor may be tripped and the user notified regarding the exceeded threshold with options for an automatic or manual retry.

Each unsuccessful retry may result in notification of the status and reduced availability to upfitter power use. Notifications can vary with audio and/or visual indicators through various means including touch screens, projections, audio cues such as internal audio system/external sounder activation, etc.

There is thus more user control and feedback to the upfitter usage rather than no notification. And prior to switching over to meet upfitter energy demands, the system may provide the option to the user to shed loads based on various factors including load type (e.g., radio, air-conditioner, upfitter load, etc.)

Figure 1:
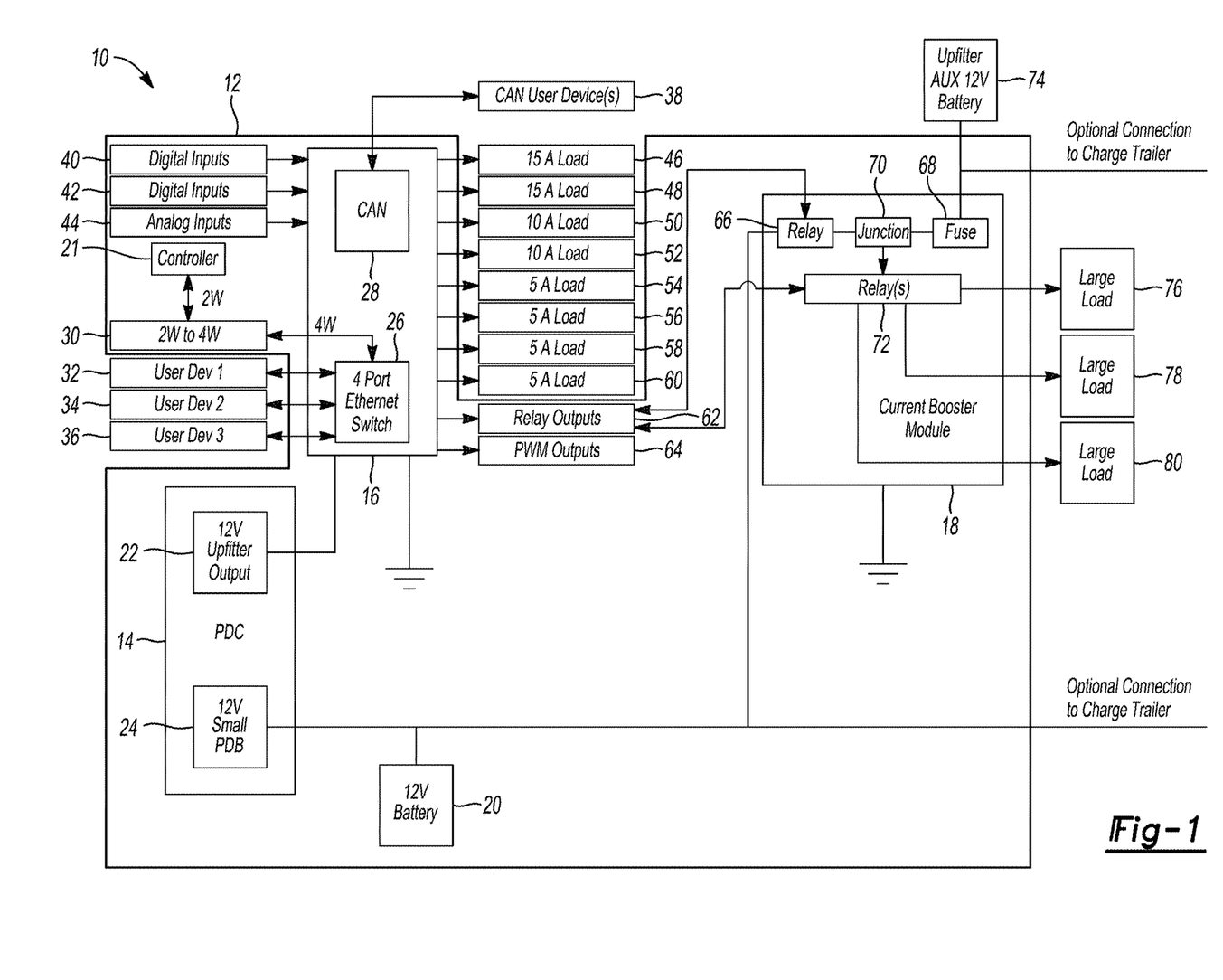
FIGS. 1 and 2 are block diagrams of an automotive power system and upfitter modules.

Referring to FIG. 1, an example automotive power system 10 for a vehicle 12 includes a power distribution center 14, an upfitter module 16, an upfitter current booster module 18, a 12V battery 20, and a controller 21.

The power distribution center 14 includes a 12V upfitter output 22 (e.g., a 100 A field effect transistor controlled output) and a 12V interconnector power distribution box 24 (e.g., a 200 A field effect transistor controlled output). The respective ratings of these field effect transistors thus define what their limits are for current flow therethrough. The 12V upfitter output 22 is connected with the upfitter module 16. The interconnector power distribution box 24 is connected with the 12V battery 20.

The upfitter module 16 is grounded and includes a four-port Ethernet switch 26 and a controller area network communications module 28. The four-port Ethernet switch 26 is connected with a two-way to four-way communication module 30, and a plurality of user devices 32, 34, 36. The controller area network communication module 28 is connected with a controller area network user device 38. The upfitter module 16 is configured to receive digital inputs 40, 42 and an analog input 44, to provide current to 15A loads 46, 48, 10A loads 50, 52, and 5A loads 54, 56, 58, 60 in this example. The upfitter module 16 is further configured to provide current to relay outputs 62 and pulse width modulation outputs 64. Multiple such upfitter modules can be so connected (e.g., daisy chained) to obtain as many inputs/outputs as necessary as mentioned above.

The upfitter current booster module 18 is grounded and includes a relay 66, a fuse 68, a junction 70, and a plurality of relays 72. The junction 70 is connected between the relay 66, fuse 68, and relays 72. The relay 66 is connected with the interconnector power distribution box 24. The fuse 68 is connected with an auxiliary 12V battery 74. The relays 72 are configured to provide current to a plurality of large loads 76, 78, 80.

In the above described high current architecture, the upfitter current booster module 18, which can be stamped track relays controlled by the upfitter module 16, is powered from a power distribution center output different from the upfitter module 16. All the expansion modules receive their power from a 100 A output from the power distribution center 14. As current usage approaches the 100 A limit, the operator can be notified (e.g., by screen, phone-as-a-key, speaker, etc.) via, for example, alerts generated and forwarded by the controller 21. The upfitter module 16 tracks and reports on loads to the controller 21, via the two-way to four-way communication module 30, which facilitates notification of the operator.

The upfitter module 16 allows/facilitates automatic load shedding (the discontinuing of power being supplied) of vehicle loads and/or upfitter loads (e.g., snow plow equipment, power tools, accessory lighting, etc.) prioritized by the operator to stay within the 100 A limit of the corresponding power distribution center output. If 100 A (or 200 A depending on the output port) is not available (as assessed using standard techniques such a current sensors, etc.) from the power distribution center 14, the controller 21 via the two-way to four-way communication module 30 notifies the upfitter module 16. The upfitter module 16 can then request that vehicle loads be shed (e.g., radio, heating, ventilation, air conditioning, etc.). The controller 21, responsive to such requests, can then generate commands to discontinue power flow to the user defined lowest priority vehicle loads. This allows upfitter features to be prioritized in certain scenarios. The reverse, and other scenarios, are also possible as explained in more detail below.

A user may input via an interface (e.g., phone screen, vehicle screen, buttons, etc.) a desired priority scheme for the shedding of upfitter loads and vehicle loads. The user, for example may prioritize all upfitter loads over vehicle loads such that vehicle loads will be shed in order from lowest priority to highest priority before any upfitter loads are shed. Alternatively, the user may prioritize all vehicle loads over upfitter loads such that upfitter loads will be shed in order from lowest priority to highest priority before any vehicle loads are shed. In other situations, the user may prioritize vehicle loads and upfitter loads in mixed fashion such that some of the vehicle loads have a higher or lower priority than some of the upfitter loads, etc. This information may reside within the upfitter module 16, the controller 21, and/or other controllers/modules. As the current magnitude associated with the power being supplied to the upfitter loads approaches a limit, commands may be generated by the controller 21 to discontinue power supply to upfitter and/or vehicle loads of lowest priority to attempt to maintain the magnitude less than the limit. That is, if upfitter load 1 and vehicle load 1 has highest priority, vehicle load 2 has middle priority, and upfitter load 2 has lowest priority, upfitter load 2 would be shed first in an attempt to maintain current magnitude less than the limit of the corresponding output. If shedding upfitter load 2 is not sufficient to maintain the current magnitude less than the limit, vehicle load 2 would then be shed next, etc.

The user may also input via the interface the type and nature of alerts to be generated corresponding to the shedding of upfitter loads and vehicle loads. This information may, as above, reside within the upfitter module 16, the controller 21, and/or other controllers/modules. The user, for example, may designate that a certain sound, tune, or audio source be used corresponding to expected or actual shedding of upfitter loads and that a different sound, tune, or audio source be used corresponding to expected or actual shedding of vehicle loads much in the same way different ring tones may be assigned to different phone numbers of a cell phone. The user can thus be able to identify whether an upfitter load or vehicle load is about to be shed or (is being shed) by recognizing the sound, tune, or audio source specific thereto. The input may further designate for particular ones of the upfitter loads and particular ones of the vehicles loads a type of alert. The user, for example, may designate that upfitter loads connected with a 100 A output of the vehicle have music from the 1950s as an alert that such are about to be shed, and that upfitter loads connected with a 200 A output of the vehicle have music from the 1980s as an alert that such are about to be shed. A variety of alert types (e.g., beeping horns, repeated tones, blinking headlights, turning on interior lights, projected graphics, etc.) are contemplated herein, but again each allows the user to specifically identify that a particular load is or about to be shed because they can specify the particular alert type corresponding to the particular load. Visual and/or a combination of audio and visual alerts may similarly be used.

Data from vehicle sensors (e.g., audio sensors, lidar, radar, passenger sensors, global positioning sensors, etc.) available to the upfitter module 16, the controller 21, and/or other controllers/modules via known communication channels may be used to calibrate a volume and/or type of the alerts. Data indicating ambient noise levels are high in a vicinity of the vehicle 12 may result in a volume of the alerts be greater than when ambient noise levels are lower. Moreover, data indicating people nearby the vehicle are further away rather than closer may result in the volume being greater so the alerts can be heard. Still further, data indicating the vehicle is inside rather than outside may result in the volume being lesser so as to not unnecessarily increase indoor noise pollution. Such settings may be designated in that a user may preselect volume levels to be used depending on ambient noise, closeness of people, location (e.g., indoor/outdoor status), etc.

Optional connections to a charge trailer are shown for the 200 A output. Communication with the charge trailer can be, for example, via controller area network or Ethernet. This allows the upfitter to exceed the 200 A continuous power distribution center limits.

Figure 2:
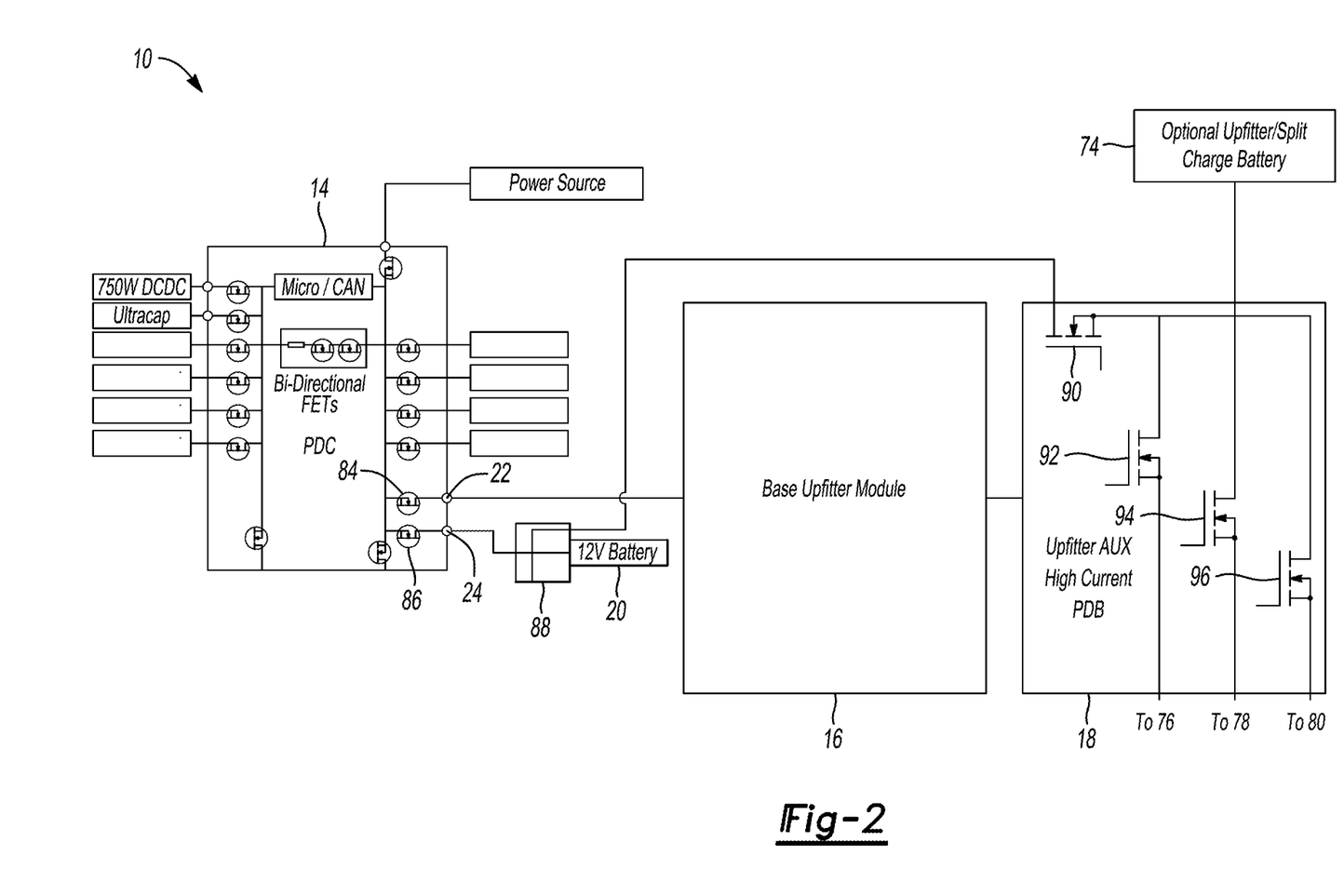

Referring to FIG. 2, the power distribution center 14 further includes a plurality of bidirectional field effect transistors 82, a 100 A capable field effect transistor 84 (continuous), and a 200 A capable field effect transistor 86 (continuous). The 100 A capable field effect transistor 84 is connected between the bidirectional field effect transistors 82 and 12V upfitter output 22. The 200 A capable field effect transistor 86 is connected between the bidirectional field effect transistors 82 and the interconnector power distribution box 24. The power distribution center 14 also includes other field effect transistors connected between the bidirectional field effect transistors 82 and other vehicle components (e.g., a DC/DC converter, an ultra-capacitor, other power sources, etc.).

The automotive power system 10 may further include a power distribution box 88. The power distribution box 88 may be packaged on top of or next to the 12V battery 20. It may serve as an interconnection point for the upfitter current booster module 18, 12V battery 20, interconnector power distribution box 24, and any jump start post.

The upfitter current booster module 18 further includes a plurality of field effect transistors 90, 92, 94, 96. The field effect transistor 90 is connected between the power distribution box 88 and field effect transistors 92, 94, 96. The field effect transistor 92 is connected between the large load 76 and field effect transistor 90. The field effect transistor 94 is connected between the auxiliary 12V battery 74, large load 78, and field effect transistor 90. The field effect transistor 96 is connected between the large load 80 and field effect transistor 90. The field effect transistor 90 is thus arranged to isolate the large load 76, 78, 90 from negative transient loads. These loads may be some of the loads that are assigned priority in the event shedding becomes necessary as described above.

Figure 3:
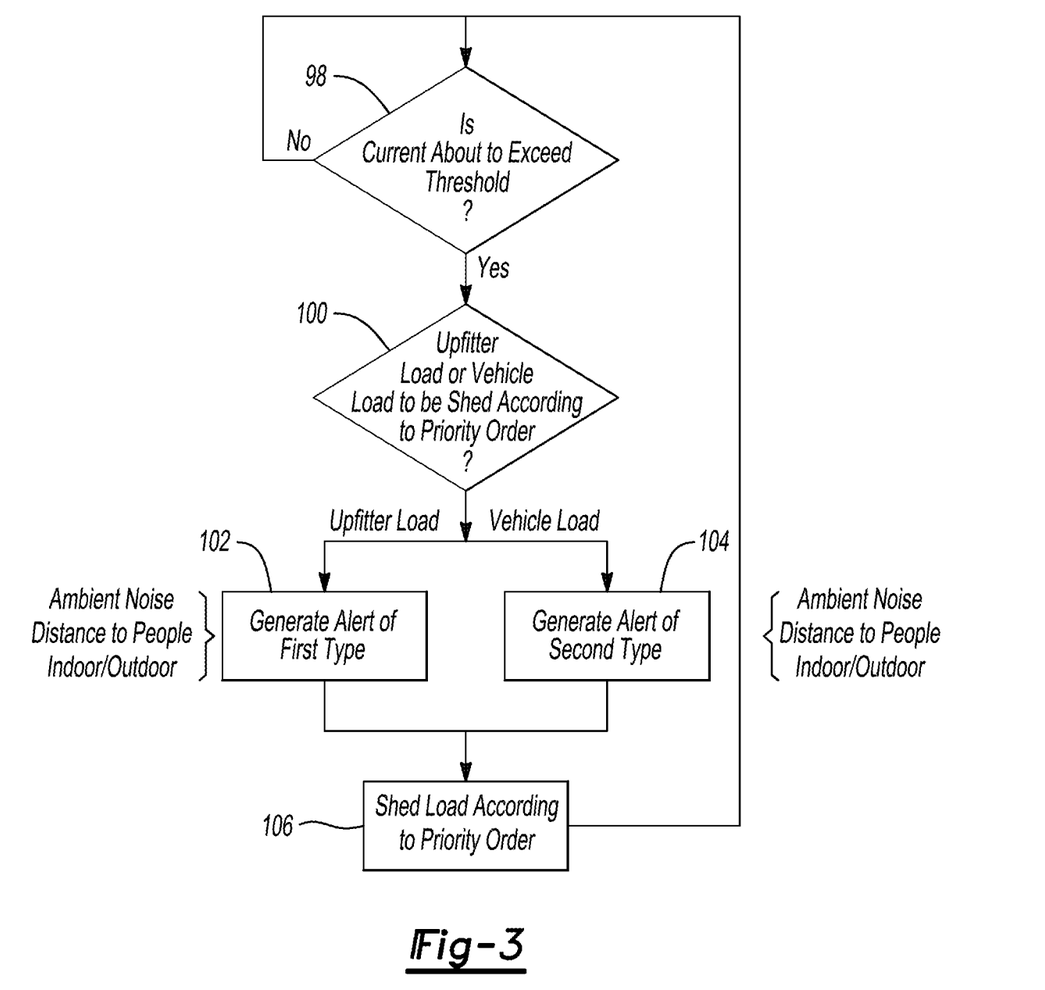
FIGS. 3 and 4 are flow charts of algorithms related to control of load shedding and alert generation for upfitter and vehicle loads.

Referring to FIG. 3, it is determined whether current being supplied to upfitter loads via an output is about to exceed the limit defined by the rating of that output at operation 98. If no, the algorithm returns to operation 98. If yes, at operation 100 it is determined whether an upfitter load or vehicle load is next to be shed according to the user defined priority order. An alert of a first type is generated at operation 102 if the next load to be shed is an upfitter load, and an alert of a second type is generated at operation 104 if the next load to be shed is a vehicle load. Identifiers may be stored that distinguish between upfitter and vehicle loads. All upfitter loads, for example, may have one designation and all vehicle loads may have another designation. As such, when a controller/module is determining which alert type to use, the designation can be inspected to reveal whether a next particular load of the priority order is an upfitter of vehicle load. As mentioned above, ambient noise, distance to others, and location data may be used to calibrate alert volume and/or other features of the alert. To the extent a certain alert type is flashing lights, such may be accompanied by audio during the day but not at night as flashing lights are more apparent at night than during the day. A variety of possibilities are contemplated. At the same time or following the alert generation, the load may be shed according to its priority order at operation 106. The algorithm then returns to operation 98.

Figure 4:
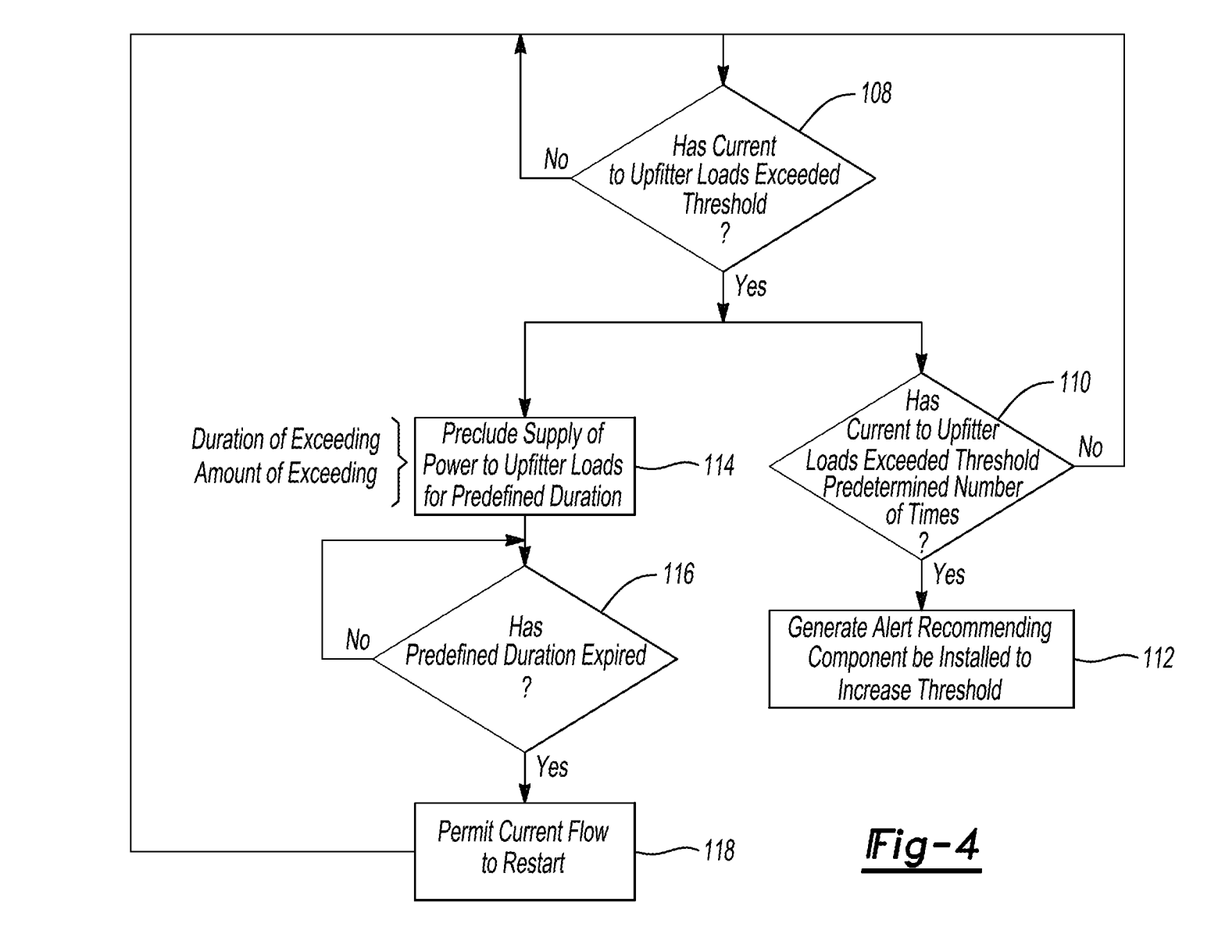

Referring to FIG. 4, it is determined whether current being supplied to upfitter loads via an output has exceeded the limit defined by the rating of that output at operation 108. If no, the algorithm returns to operation 108. If yes, at operation 110 it is determined whether the current has exceeded the limit a predetermined number of times (e.g., four times). A counter, for example, may be implemented each time the limit is exceeded. If no, the algorithm returns to operation 108. If yes, an audio and/or visual alert is generated recommending a component (e.g., a field effect transistor with higher rating) be installed in the output to increase the limit at operation 112.

Returning to operation 108, if yes, at operation 114 supply of power to at least one upfitter load is precluded for a predefined duration of time (e.g., two minutes). As mentioned above, the duration of the exceeding and the amount by which the limit is exceeded may be used to calibrate the length of the predefined duration. In some examples, the longer the duration or the greater the amount, the longer the predefined duration, etc. At operation 116, it is determined whether the predefined duration has expired. If no, the algorithm returns to operation 116. If yes, current flow to the at least one upfitter load is permitted to be restarted at operation 118. The algorithm then returns to operation 108.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system of a vehicle, comprising:
   one or more controllers programmed to
   receive input of a user defining a priority order that indicates a sequence in which supply of power to upfitter loads and vehicle loads will be discontinued responsive to a magnitude of current associated with power from the vehicle being supplied to the upfitter loads approaching a predefined threshold,
   generate alerts prior to discontinuance of power to the upfitter loads and vehicle loads according to the sequence such that the alerts corresponding to discontinuance of power to the upfitter loads are different than the alerts corresponding to discontinuance of power to the vehicle loads,
   receive input of the user selecting a first alert type for a particular one of the upfitter loads or vehicle loads such that only the corresponding alert generated prior to discontinuance of power to the particular one of the upfitter loads or vehicle loads is of the first alert type, and
   calibrate a volume of the alerts based on an ambient noise level in a vicinity of the vehicle.

2. The power system of claim 1, wherein the one or more controllers are further programmed to first discontinue supply of power to the upfitter loads and vehicle loads of lowest priority among the sequence such that the magnitude remains less than the predefined threshold.

3. The power system of claim 1, wherein the one or more controllers are further programmed to, responsive to indication that the magnitude has exceeded the predefined threshold a predefined number of times, generate an alert indicating that at least one component be installed in the vehicle to increase the predefined threshold.

4. The power system of claim 1, wherein the one or more controllers are further programmed to calibrate thea volume of the alerts based on distances between the vehicle and nearby people.

5. The power system of claim 1, wherein the alerts include visual alerts.

6. The power system of claim 1, wherein some of the vehicle loads have a priority order lower than some of the upfitter loads.

7. A method comprising:
responsive to a magnitude of current associated with power from a vehicle being supplied to upfitter loads approaching a predefined threshold,
discontinuing supply of power to the upfitter loads according to a user defined priority order such that the upfitter loads of lowest priority among the priority order are sequentially shed first to maintain the magnitude less than the predefined threshold,
generating an alert corresponding to the shed of each of the upfitter loads according to types defined by the user such that the alert corresponding to the shed of one of the upfitter loads is different than the alert corresponding to the shed of another one of the upfitter loads,
calibrating a volume of the alerts according to whether the vehicle is located indoors or outdoors; and
receiving input of the user selecting a first alert type for a particular one of the upfitter loads such that only the corresponding alert generated prior to discontinuance of power to the particular one of the upfitter loads is of the first alert type.

8. The method of claim 7 further comprising calibrating the volume of the alerts according to an ambient noise in a vicinity of the vehicle such that a greater the ambient noise a louder the volume.

9. The method of claim 7 further comprising calibrating the volume of the alerts according to distances between the vehicle and nearby people.

10. The method of claim 7, wherein the alerts include visual alerts.

11. The method of claim 7 further comprising generating an alert indicating that at least one component be installed in the vehicle to increase the predefined threshold responsive to indication that the magnitude has exceeded the predefined threshold a predefined number of times.

12. The method of claim 7 further comprising generating the alerts prior to the corresponding discontinuing.

13. A vehicle comprising:
a power distribution center including an output;
an upfitter module connected to the output; and
one or more controllers programmed to,
responsive to a magnitude of current associated with power from the vehicle supplied to upfitter loads, that are connected with the power distribution center via the upfitter module, exceeding a predefined threshold, preclude supply of the power to at least one of the upfitter loads for a predefined duration of time, and
responsive to the magnitude exceeding the predefined threshold a predefined number of times, generate an alert recommending that at least one component be installed in the vehicle to increase the predefined threshold.

14. The vehicle of claim 13, wherein the predefined duration of time depends on a duration of the exceeding or an amount by which the magnitude is greater than the predefined threshold during the exceeding.

15. The vehicle of claim 13, wherein the one or more controllers are further programmed to, responsive to the magnitude approaching the predefined threshold, generate an alert and shed at least one of the upfitter loads having lowest priority as defined by a priority order input by a user.

16. The vehicle of claim 13, wherein the one or more controllers are further programmed to, responsive to the magnitude approaching the predefined threshold, generate an alert and shed at least one load of the vehicle having lowest priority as defined by a priority order input by a user.

17. The vehicle of claim 13, wherein the one or more controllers are further programmed to calibrate a volume of the alert based on an ambient noise level in a vicinity of the vehicle or distances between the vehicle and nearby people.

\* \* \* \* \*